United States Patent
Zouzal et al.

(10) Patent No.: US 10,085,565 B2
(45) Date of Patent: Oct. 2, 2018

(54) SACRAL AIR BLADDER ASSEMBLY

(71) Applicants: Lear Corporation, Southfield, MI (US); Winsen C. Zouzal, Detroit, MI (US)

(72) Inventors: Winsen C. Zouzal, Detroit, MI (US); Gerald Patrick, Shelby Township, MI (US); Walter T. Cichocki, Brighton Township, MI (US); Ted Smith, Waterford, MI (US); Michelle A. Pereny, Farmington Hills, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/964,095

(22) Filed: Dec. 9, 2015

(65) Prior Publication Data
US 2017/0164748 A1 Jun. 15, 2017

(51) Int. Cl.
| | |
|---|---|
| *B60N 2/40* | (2006.01) |
| *A47C 7/46* | (2006.01) |
| *B60N 2/66* | (2006.01) |
| *A47C 7/14* | (2006.01) |
| *B60N 2/90* | (2018.01) |

(52) U.S. Cl.
CPC .............. *A47C 7/467* (2013.01); *A47C 7/14* (2013.01); *B60N 2/665* (2015.04); *B60N 2/914* (2018.02)

(58) Field of Classification Search
None
See application file for complete search history.

(56) References Cited

U.S. PATENT DOCUMENTS

| | | | | |
|---|---|---|---|---|
| 3,652,126 A | * | 3/1972 | Folling ................... | A47C 7/467 297/284.6 |
| 4,114,214 A | | 9/1978 | VonHeck | |
| 4,516,568 A | * | 5/1985 | Baxter .................... | A47C 7/425 297/230.14 |
| 4,592,588 A | * | 6/1986 | Isono ..................... | A47C 7/022 297/284.11 |

(Continued)

FOREIGN PATENT DOCUMENTS

| | | |
|---|---|---|
| DE | 3690372 T1 | 7/1987 |
| DE | 4022423 A1 | 1/1991 |

(Continued)

OTHER PUBLICATIONS

U.S. Appl. No. 14/869,093 Air Bladder Assembly for Seat Bottoms of Seat Assemblies, filed Sep. 29, 2015; Inventor: Gerald Patrick.

(Continued)

*Primary Examiner* — Joshua J Michener
*Assistant Examiner* — Kyle Walraed-Sullivan
(74) *Attorney, Agent, or Firm* — Brooks Kushman P.C.

(57) ABSTRACT

A seat assembly is provided with a seat bottom and a seat back mounted adjacent the bottom. The seat back and seat bottom are provided with an occupant seating surface. At least one air bladder is oriented in a sacral region the seat bottom or the seat back. The air bladder has a support surface defined by a enlarged width portion and extends to an elongated tapered portion. When the air bladder is inflated, the support surface is inclined from the taper portion to the enlarged width portion relative to the seating surface.

17 Claims, 2 Drawing Sheets

(56) References Cited

U.S. PATENT DOCUMENTS

| | | | | |
|---|---|---|---|---|
| 4,615,563 | A * | 10/1986 | Kobayashi | A47C 7/022 297/284.11 |
| 4,840,425 | A | 6/1989 | Noble | |
| 4,920,591 | A | 5/1990 | Sekido et al. | |
| 4,965,899 | A * | 10/1990 | Sekido | B60N 2/665 297/284.11 |
| 4,981,131 | A | 1/1991 | Hazard | |
| 4,981,325 | A | 1/1991 | Zacharkow | |
| 5,127,708 | A * | 7/1992 | Kishi | A61B 5/18 297/284.1 |
| 5,129,704 | A | 7/1992 | Kishi et al. | |
| 5,155,685 | A * | 10/1992 | Kishi | B60N 2/66 296/63 |
| 5,277,474 | A | 1/1994 | Hannagan et al. | |
| 5,283,735 | A | 2/1994 | Gross et al. | |
| 5,320,409 | A * | 6/1994 | Katoh | B60N 2/0232 297/284.6 |
| 5,812,399 | A | 9/1998 | Judic et al. | |
| 5,860,699 | A * | 1/1999 | Weeks | A47C 7/467 297/284.1 |
| 6,037,731 | A | 3/2000 | Fruehauf et al. | |
| 6,055,473 | A * | 4/2000 | Zwolinski | B60N 2/002 296/65.18 |
| 6,074,006 | A * | 6/2000 | Milosic | A47C 7/467 297/284.4 |
| 6,088,642 | A | 7/2000 | Finkelstein et al. | |
| 6,125,851 | A * | 10/2000 | Walker | A61G 5/1091 128/845 |
| 6,203,105 | B1 * | 3/2001 | Rhodes, Jr. | A47C 4/54 297/284.1 |
| 6,273,810 | B1 * | 8/2001 | Rhodes, Jr. | A47C 4/54 297/180.13 |
| 6,384,715 | B1 * | 5/2002 | Potter | A47C 7/467 340/407.1 |
| 6,677,720 | B2 | 1/2004 | Fraser | |
| 6,682,059 | B1 * | 1/2004 | Daniels | A47C 4/54 267/131 |
| 6,901,617 | B2 | 6/2005 | Sprouse, II et al. | |
| 7,059,678 | B1 | 6/2006 | Taylor | |
| 7,113,100 | B2 | 9/2006 | Yoshinori et al. | |
| 7,152,920 | B2 | 12/2006 | Sugiyama et al. | |
| 7,537,286 | B2 * | 5/2009 | Walker | A47C 7/462 297/284.3 |
| 7,878,590 | B1 | 2/2011 | Bilak et al. | |
| 7,931,334 | B1 | 4/2011 | Caruso | |
| 8,157,321 | B2 | 4/2012 | McMillen et al. | |
| 8,603,001 | B2 | 12/2013 | Fujita et al. | |
| 8,671,482 | B2 | 3/2014 | Willingham | |
| 8,814,269 | B2 | 8/2014 | Suzuki et al. | |
| 2002/0047297 | A1 | 4/2002 | Longhi et al. | |
| 2002/0056709 | A1 * | 5/2002 | Burt | A47C 4/54 219/217 |
| 2002/0180249 | A1 | 12/2002 | Felton et al. | |
| 2003/0230917 | A1 | 12/2003 | Dorfler et al. | |
| 2005/0127728 | A1 | 6/2005 | Sugiyama et al. | |
| 2005/0264069 | A1 | 12/2005 | Makhsous et al. | |
| 2006/0103204 | A1 | 5/2006 | Walker et al. | |
| 2009/0091168 | A1 | 4/2009 | Kretschmer et al. | |
| 2009/0152916 | A1 | 6/2009 | Lin et al. | |
| 2010/0139003 | A1 * | 6/2010 | Moutafis | A61G 7/05769 5/655.3 |
| 2010/0207431 | A1 * | 8/2010 | Petzel | B60N 2/4415 297/180.16 |
| 2010/0276973 | A1 | 11/2010 | Zenk et al. | |
| 2010/0289302 | A1 * | 11/2010 | Cheng | B60N 2/002 297/180.12 |
| 2012/0143108 | A1 * | 6/2012 | Bocsanyi | B60N 2/4415 601/148 |
| 2013/0285426 | A1 * | 10/2013 | Arant | B60N 2/62 297/284.1 |
| 2014/0265491 | A1 | 9/2014 | Galbreath et al. | |
| 2014/0265492 | A1 | 9/2014 | Larsen | |
| 2015/0035323 | A1 * | 2/2015 | Diop | B60N 2/4415 297/180.14 |
| 2015/0126916 | A1 * | 5/2015 | Hall | B60N 2/448 601/149 |
| 2015/0145296 | A1 | 5/2015 | Hotary et al. | |
| 2015/0183353 | A1 * | 7/2015 | Chen | B60N 2/646 297/452.29 |
| 2016/0046216 | A1 | 2/2016 | Byun et al. | |
| 2016/0129920 | A1 * | 5/2016 | Hall | B60W 50/16 701/1 |
| 2016/0185263 | A1 * | 6/2016 | Uno | B60N 2/4415 297/284.1 |
| 2016/0288681 | A1 * | 10/2016 | Ferretti | B60N 2/72 |
| 2016/0325641 | A1 * | 11/2016 | Ohno | B60N 2/0276 |

FOREIGN PATENT DOCUMENTS

| | | |
|---|---|---|
| DE | 20107871 U1 | 9/2002 |
| WO | 9611614 A1 | 4/1996 |

OTHER PUBLICATIONS

U.S. Appl. No. 14/575,474 Adjustable Seat Assembly, filed Dec. 18, 2014; Inventor: Winsen C. Zouzal.

Non-Final Office Action of U.S. Appl. No. 14/964,035 dated Apr. 28, 2017; 16 pages.

Office Action of German application No. 102016222465.4; dated Oct. 11, 2017; 8 pages.

First Office Action for Chinese Application No. 201611034345.4, dated Jul. 16, 2018, 7 Pages.

* cited by examiner

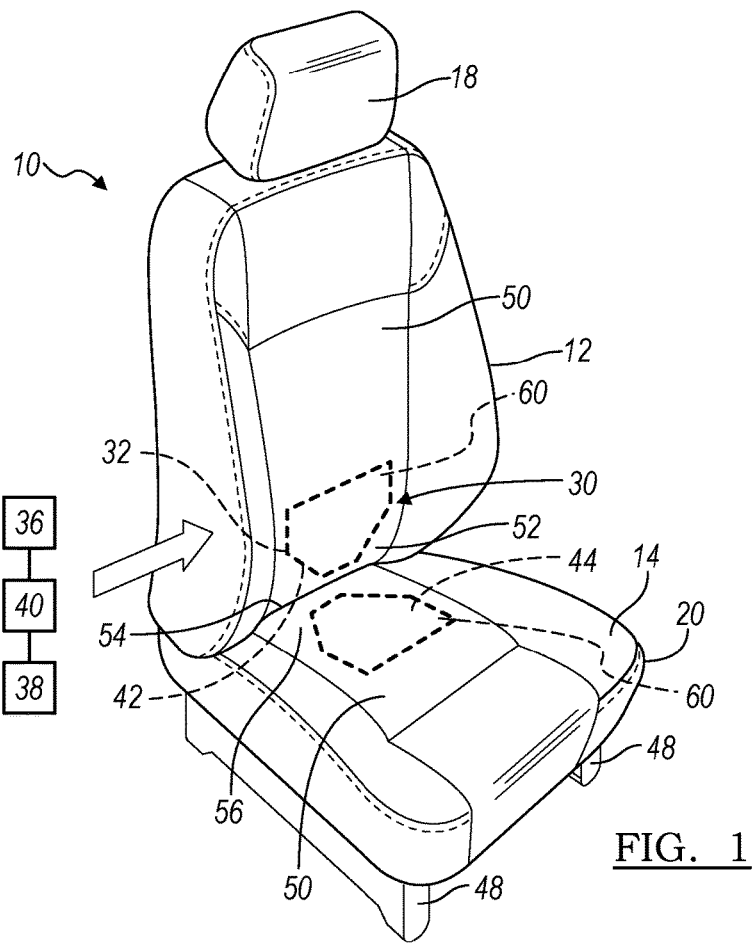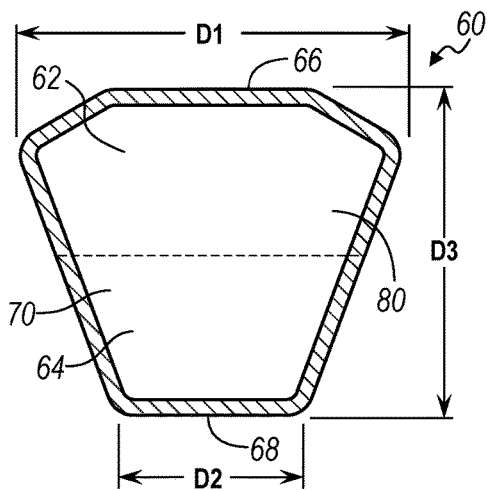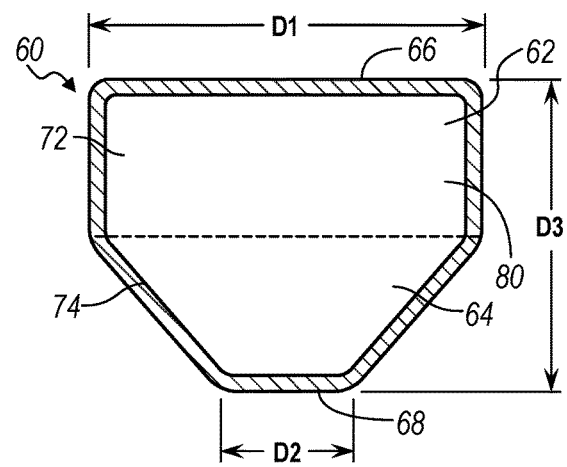
FIG. 1
FIG. 2A
FIG. 2B

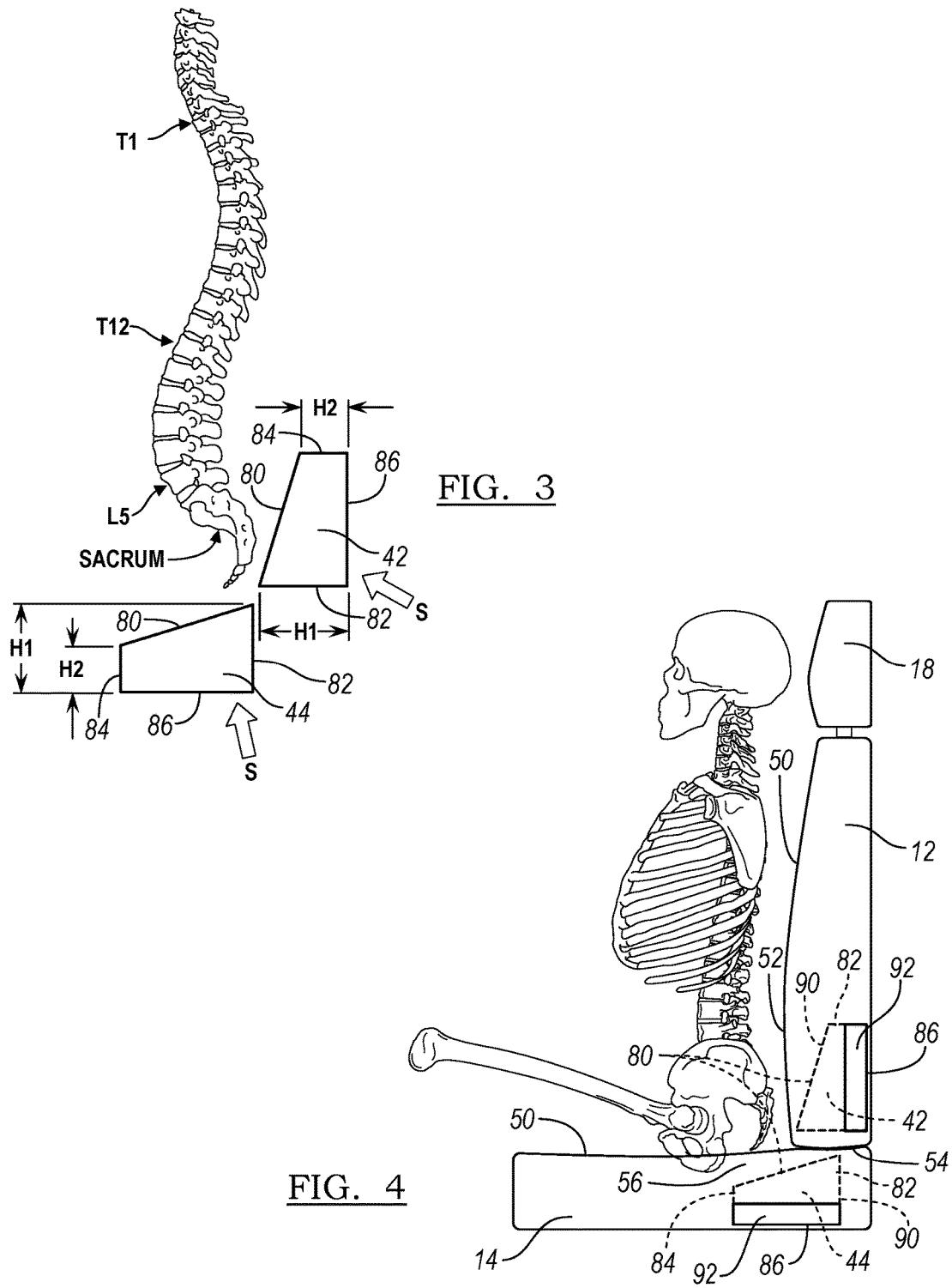

SACRAL AIR BLADDER ASSEMBLY

TECHNICAL FIELD

Various embodiments are directed to an air bladder assembly for a sacral region of a seat.

BACKGROUND

U.S. Patent Publication No. US 2014/0265491 by Lear Corporation, published on Sep. 18, 2014, illustrates and describes an air bladder assembly for a seat.

SUMMARY

According to one embodiment, a seat assembly is provided with a seat bottom and a seat back mounted adjacent the seat bottom and extending generally in an upright direction. The seat back and seat bottom are provided with an occupant seating surface. At least one air bladder is oriented in a sacral region the seat bottom or the seat back. The air bladder has a support surface defined by an enlarged width portion and extends to a elongated tapered portion. When the air bladder is inflated, the support surface is inclined from the taper portion to the enlarged width portion relative to the seating surface.

According to another embodiment, the seating surface of the seat back and the seat bottom are joined at a bite line. The air bladder is positioned adjacent the bite line.

According to one other embodiment, the air bladder is oriented with the elongated tapered portion positioned closer to the bite line than the enlarged width portion.

According to another embodiment, the air bladder is oriented with the elongated tapered portion positioned between the bite line and the enlarged width portion.

According to a further embodiment, the air bladder is oriented in the seat back so that during inflation the air bladder inflates in a downward and forward direction relative to the seat back so that the support surface is inclined relative to the seating surface.

According to another embodiment, the air bladder is oriented in the seat bottom so that during inflation the air bladder inflates in a rearward and upward direction relative to the seat bottom so that the support surface is inclined relative to the seating surface of the seat bottom.

According to a further embodiment, the at least one air bladder is a generally hexagonal shape.

According to another embodiment, a seat assembly is provided with a seat bottom and a seat back mounted adjacent the seat bottom and extending generally in an upright direction, wherein the seat back and seat bottom are provided with an occupant seating surface. The seat assembly includes first and second air bladders each having a support surface defined by a enlarged width portion extending to a elongated tapered portion. When the air bladders are inflated, the support surfaces are inclined relative to the seating surface. The first air bladder is disposed in the seat bottom and the second air bladder is disposed in the seat back.

According to one other embodiment, the first and second air bladders are oriented with the elongated tapered portions oriented toward each other and the enlarged width portions oriented away from each other.

According to another embodiment, the seating surface of the seat back and the seat bottom are joined at a bite line. The first and second air bladders are positioned adjacent the bite line.

According to a further embodiment, the first and second air bladders are oriented with the elongated tapered portion positioned closer to the bite line than the enlarged width portion.

According to another embodiment, both of the first and second air bladders are oriented with the elongated tapered portion positioned between the bite line and the enlarged width portion.

According to still another embodiment, there is no other air bladder between the first and second air bladders.

According to another embodiment, an air bladder assembly for a seat is provided. The air bladder assembly includes at least one air bladder having a support surface defined by a hexagonal shape with a enlarged width portion extending to a elongated tapered portion. When the air bladder is inflated, the elongated tapered portion inflates to a first height being greater than a second height of the enlarged width portion so that the support surface is inclined relative to a seating surface of the seat.

According to one other embodiment, the enlarged width portion is a rectangle shape and the elongated tapered portion is an irregular trapezoid shape.

According to a further embodiment, a long edge of the rectangular shape and a short edge of the trapezoid shape are generally parallel.

According to another embodiment, the air bladder assembly includes upper and lower air bladders each having a support surface with a hexagonal shape with the enlarged width portion extending to the elongated tapered portion. The upper and lower air bladders are positioned with the elongated tapered portions oriented toward each other and the enlarged width portions oriented away from each other.

BRIEF DESCRIPTION OF THE DRAWINGS

Certain embodiments of the present disclosure are pointed out herein. However, other features of the various embodiments will become more apparent and will be further understood by referring to the following detailed description in conjunction with the accompanying drawings, in which:

FIG. 1 is a perspective view of an exemplary seat assembly incorporating a sacral support system;

FIG. 2A is an air bladder for use with the seat assembly of FIG. 1 according to one embodiment;

FIG. 2B is an air bladder for use with the seat assembly of FIG. 1 according to one embodiment;

FIG. 3 is a side schematic view of a portion of the sacral support system of FIG. 1 according to one embodiment; and FIG. 4 is a side schematic view of the sacral support system of FIG. 1 according to one embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except for otherwise expressly indicated, all numerical quantities in this description indicating amounts are to be understood as modified by the word "about" in describing the broader scope of the disclosure. Also, unless expressly stated to the contrary, the description of a group or class of materials as suitable or preferred for a given purpose in connection with the disclosure implies that any two or more members of the group or class may be equally suitable and preferred.

Referring now to the Figures, where like numerals are used to designate like structures throughout the drawings, a seat assembly 10 in accordance with at least one embodiment of the present invention is generally shown in FIG. 1. The seat assembly 10 includes a seat back 12 and a seat bottom 14. As shown, the seat back 12 extends generally in the upright direction and is pivotally attached to the seat bottom 14. Each of the seat back 12 and the seat bottom 14 typically include a cushion or padding (not shown) and a trim cover 20 for decoratively covering and protecting the cushion. Typically, the cushion is made of an expandable foam material and is molded to a desired shape. The seat assembly 10 may also include a head restraint 18 that is adjustable in relation to the seat back 12.

While the seat assembly 10 in FIG. 1 is illustrated as a vehicle seat assembly, it should be understood that the principles of the present application are applicable to other types of seat assemblies, such as for an aircraft, an office chair, a comfort chair or any seat assembly that can benefit by an adjustable posture system.

In a correct neutral seated posture, the load of the upper body is directed through the ischia and into the seat cushion. To ensure the occupant is correctly seated, it has been found that it is helpful to support the occupant's sacrum and direct the position of the sacroiliac joint to allow the occupant to achieve a correct neutral seating posture. By supporting the sacrum lumbar lordosis and hyper-flexion between the sacrum and the L5 vertebrae can be limited or even prevented entirely.

The seat assembly 10 also includes a sacral support system, which is referenced generally by numeral 30. The seat assembly 10 is illustrated with bladders that can be each adjustable and individually or collectively inflated to provide sacral support in the seat.

According to one embodiment, the sacral support system is a power pneumatic system in a seat back 12 or seat bottom 14 which provides support to sacrum (FIGS. 3-4) and directs the position of the sacroiliac joint to achieve a proper neutral seating posture. The sacral support system 30 may be shaped in a wedge configuration as depicted in FIG. 3, to provide support in a forward and upwards direction (arrow S) to the sacrum while the occupant is seated in a standard seating or driving position.

The sacral support system 30 is provided with actuators 32 disposed in the seat back 12 and seat bottom 14 that move between an extended position and a retracted position. Each actuator 32 may apply pressure or support to the seated passenger.

The actuators 32 may include pneumatic bladders that inflate and deflate to provide various degrees of support to the seated passenger along the seat back 12 or seat bottom 14. The actuators 32 may also include movable supports. For example, the actuators 32 may have any contoured shape support surface. The actuators 32 are formed of a material that has a hardness that is greater than the hardness of the cushion, such as hard plastic or harder foam, in order to provide greater support in the extended position. Further, the actuators 32 extend and retract using any suitable mechanism known to a person having ordinary skill in the art.

As shown in FIG. 1, the sacral support system 30 includes an upper sacral bladder 42 positioned along the lower region 52 of the seat back 12. The lower region 52 of the seat back 12 is adjacent the bite line 54 of the seat where the seat back 12 abuts the seat bottom 14.

Also shown in FIG. 1, the sacral support system 30 includes a lower sacral bladder 44 positioned along a rear region 56 of the seat bottom 14. The rear region 56 of the seat back 12 is adjacent the bite line 54 of the seat where the seat back 12 abuts the seat bottom 14.

The sacral support system 30 may also include a controller 38 for regulating any movement of the actuators 32. For example, as shown in FIG. 4, the controller 38 may regulate compressed air to inflate the bladders 42, 44 to the extended position and similarly deflate the bladders 42, 44 to the retracted position. In one embodiment, the upper sacral bladder 42 is decoupled from the lower sacral bladder 44. By decoupling the actuators, the upper sacral bladder 42 is independently controllable from the lower sacral bladder 44.

The sacral support system 30 may also include a compressor 36 that provides a source of air to the bladder 42, 44. The compressor 36 and controller 38 may be provided in the seat back 12, the seat bottom 14 or concealed within the vehicle body. The controller 38 may be a multifunction controller that also controls other functions in the vehicle. Each of the bladders 42, 44 may include a valve 40 to receive the compressed air. The valves 40 controlled by the controller 38 for regulating compressed air into and out of the bladders 42, 44. The valves 40 for each of the bladders 42, 44 may be controlled independently.

In at least one embodiment, each of the air bladders 42, 44 is shaped as an irregular hexagon bladder 60, as shown in FIGS. 2A and 2B.

In one embodiment, shown in FIG. 2A, the bladder 60 has an irregular, hexagon shape. The hexagon shaped bladder 60 includes an enlarged width portion 62 and an elongated tapered portion 64. The hexagon bladder 60 has a first distal edge 66 forming the distal edge of the enlarged width portion 62. A second distal edge 68 is opposite to the first distal edge 66 and forms the distal edge of the elongated tapered portion 64. As also shown in FIG. 2A, the first distal edge 66 is oriented closer to the overall enlarged width D1. In FIG. 2A, the elongated tapered portion 64 forms a trapezoidal shape 70 that continuously tapers from the overall enlarged width D1. In the embodiment shown in FIG. 2A, the first distal edge 66 is generally parallel to the second distal edge 68 and the first distal edge 66 has generally the same narrow width dimension D2 as the second distal edge.

In another embodiment, shown in FIG. 2B, the bladder 60 includes a rectangular portion 72 and a trapezoidal portion 74 that cooperate to form the irregular, convex hexagon shape. In FIG. 2B, the enlarged width portion 62 is defined by the rectangular portion 72. The trapezoidal portion 74 defines the elongated tapered portion 64. In the embodiment in FIG. 2B, the hexagon bladder 60 has a first distal edge 66 that is longer than and opposite to a second distal edge 68. The long distal edge 66 defines the enlarged width D1 of the rectangular portion 62 and of the hexagonal bladder 60. The trapezoidal portion 74 narrows from the rectangular portion 72 to the short distal edge 68. In the embodiment shown in FIG. 2B, the long distal edge 66 is generally parallel to the short distal edge 68.

While two embodiments describing irregular hexagon shaped bladders 60 are illustrated in FIGS. 2A and 2B, other shaped bladders are possible that include an enlarged width portion 62 and an elongated tapered portion 64. For example, the bladders may have a wedge or triangle shape or other suitable shape that has an enlarged width portion 62 cooperating with an elongated tapered portion 64.

The elongated tapered portion 64 may be sized to be located between the ischia of an average occupant. For example, the second distal edge 68 may have a dimension D1 being approximately 30 millimeters (mm). Alternatively, the second distal edge 68 may have a dimension D1 in the range of 30 mm to 70 mm, for example. The expanded width D2 may have a dimension being approximately 116 mm. Alternatively, the expanded width D2 may have a dimension in the range of 60 mm to 120 mm, for example.

The bladder 60 may have an overall length D3 of approximately 120 mm. Alternatively, the overall length D3 may have a dimension in the range of 80 mm to 150 mm, for example. As shown in FIG. 2A and FIG. 2B, the elongated tapered portion 64 is at least half of the overall length D3. Of course, the dimensions may vary based on the seat design, seat dimensions and the intended occupant, as well as other considerations.

When inflated, the bladder 60 has an inclined support surface 80 relative to a seating surface of the seat 10. The inclined support surface 80 is defined because the second distal edge 68 inflates and extends to a height that is greater than the first distal edge 66, as shown in FIG. 3. For example, the second distal edge 68 inflates and extends to a first height 82 that is greater than a second height 84 of the first distal edge 66. The first height 82 may have a dimension H1 in the range of 30 mm to 60 mm, while the second height 84 may have a dimension H2 between zero and 45 mm.

While the irregular hexagon shaped bladder 60 is illustrated, other shaped bladders having a generally planar surface that includes an elongated tapered portion 64 extending from an enlarged width portion are possible. For example, the bladders may have a wedge or triangle shape or other suitable shape that has an enlarged width portion 62 cooperating with an elongated tapered portion 64.

The second distal edge 68 includes folds (not shown) disposed between the support surface 80 and a mounting surface 86. When the bladders 42, 44 are inflated to an expanded position 90, the folds along the second distal 68 expand in an accordion-like manner to the first height 82. The first distal edge 66 may include fewer folds, or no folds at all, so that the second height 84 is less than the first height 82. Along the first distal edge 66, the support surface 80 may be directly connected to the mounting surface 86 so that the first distal edge 66 does not expand at all when inflated. In the retracted position 92, the bladders 42, 44 are not inflated and are generally flat, as shown in FIG. 4.

The upper bladder 42 and lower bladder 44 may each have different dimensions, even though the overall shape may be similar, as shown in FIG. 1. Alternatively, the upper bladder 42 and lower bladder 44 may each have a different shape while each having an enlarged width portion 62 cooperating with an elongated tapered portion 64.

As shown in FIG. 1, the vehicle seat assembly 10 includes a seat frame 48. The seat frame 48 may have a plurality of mounting brackets adapted to operatively secure the seat frame 48 within a passenger compartment of a vehicle. Any suitable seat frame may be used. The seat frame 48 may be constructed from any material suitable for application within a vehicle seat assembly 10, such as aluminum, steel or other metal alloy, composite material, or a suitable polymer. Further, the seat frame 48 may be manufactured using techniques commonly known in the art, and relative to the type of material employed. For example, manufacturing techniques may include stamping, welding, fastening or molding a suitable material to form the seat frame 48. The bladders 42, 44 may be disposed between the frame 48 and the seat cushion. Alternatively, the bladders 42, 44 may be positioned on an A-surface of the cushion between the cushion and a trim cover 20.

The bladders 42, 44 may be attached to the frame 48 or the seat cushion along the mounting surface 86 of the bladders. The mounting surface 86 remains stationary in a mounting position to ensure the bladders are maintained in a correct position for providing proper support for the occupant's sacrum.

Additionally, an array of pressure sensors may be provided in the seat back 12 and seat bottom 14, such as along the lower pelvic region 52 and a lumbar region 58, above the lower pelvic region 52, of the seat back 12. Sensors may also be provided in each of the bladders 42, 44. The sensors measure pressure or proximity at each location to provide feedback to the controller 38 for subsequent adjustment and monitoring as described in the prior embodiments. The sensors may be bladder pressure sensors, bladder valve pressure feedback sensors, proximity sensors, tri-axial angular measurement sensors or the like. Additionally, any arrangement and quantity of sensors is contemplated for various seat assembly embodiments.

The sensors measure pressure readings that are conveyed to the controller 38. The controller 38 compares pressure values to determine if the occupant is seated with hyper-flexion between the sacrum and the L5 vertebrae, for example. If the controller 38 determines that the pressure is constant along lower sacral/pelvic region and the lumbar region, the controller 38 can determine that the occupant does not have hyper-flexion between the sacrum and the L5 vertebrae. If the pressure readings along the lumbar region 58 are less than along the lower pelvic region 52, the controller 38 can determine that the occupant is has hyper-flexion between the sacrum and the L5 vertebrae. In response to determining the occupant has hyper-flexion, the controller may commands the sacral air bladders 42, 44 to be inflated. A control system for positioning the pelvis of the occupant in a neutral position was disclosed by the Applicant in U.S. application Ser. No. 14/869,093, and is hereby incorporated by reference. A control system for sequentially inflating air bladders to position the occupant's spine in a neutral position was disclosed by the Applicant in U.S. application Ser. No. 14/575,474, and is hereby incorporated by reference.

As shown in FIGS. 3-4, when the bladders 42, 44 are inflated the support surface 80 provides support in a forward and upwards direction, as shown by arrow S. The bladders 42, 44 provide support to the sacrum while the occupant is seated in a standard seating or driving position. By providing the forward and upward support, the bladders 42, 44 rotate the occupant's pelvis under and ensure the occupant is in a neutral seated position and reduce or eliminate hyper-flexion between the sacrum and the L5 vertebrae.

As shown in FIG. 4, the upper bladder 42 is positioned along the lower region of the seat back 12. The second distal edge 68 of the upper bladder 42 is aligned with a lower edge of the seat back frame 48. The upper bladder 42 is sized so that the length D3 of the bladder 42 generally does not extend above the pelvis of an average-sized occupant.

As also shown in FIG. 4, the lower bladder 44 is positioned along the rear region 56 of the seat bottom 14. The second distal edge 68 of the lower bladder 42 is aligned with a rear edge of the seat bottom frame 48. The lower bladder 44 is sized so that the length D3 of the bladder 42 is generally positioned under the pelvis and buttocks of the occupant not extending under the thighs of an average-sized occupant.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a seat bottom;
a seat back mounted adjacent the seat bottom and extending generally in an upright direction, wherein the seat back and seat bottom are provided with an occupant seating surface; and
first and second air bladders each having a generally hexagonal support surface defined by an enlarged width portion and extending to an elongated tapered portion having a width less than the enlarged width portion, wherein the first air bladder is disposed in the seat back and the second air bladder is disposed in the seat bottom,
whereby inflation of the first and second air bladders inclines the support surfaces from the tapered portion to the enlarged width portion relative to the seating surface,
wherein the first and second air bladders are oriented with the elongated tapered portions oriented toward each other and the enlarged width portions oriented away from each other.

2. The seat assembly of claim 1 wherein the seating surface of the seat back and the seat bottom are joined at a bite line; and
wherein the first and second air bladders are positioned adjacent the bite line.

3. The seat assembly of claim 2 wherein the first and second air bladders are oriented with the elongated tapered portions positioned closer to the bite line than the enlarged width portions.

4. The seat assembly of claim 2 wherein the first and second air bladders are oriented with the elongated tapered portion positioned between the bite line and the enlarged width portion.

5. The seat assembly of claim 1 wherein the first air bladder oriented in the seat back inflates in an downward and forward direction relative to the seat back so that the support surface inclines relative to the seating surface.

6. The seat assembly of claim 1 wherein the tapered portion of the hexagonal shaped support surface of each of the first and second bladders is defined an irregular trapezoid shape.

7. The seat assembly of claim 1 wherein the second air bladder oriented in the seat bottom inflates in rearward and upward directions relative to the seat bottom so that the support surface is inclined relative to the seating surface of the seat bottom.

8. The seat assembly of claim 6 wherein the wide portion of the hexagonal shaped support surface of each of the first and second bladder is a rectangle shape,
wherein a long edge of the rectangular shapes and a short edge of the trapezoid shapes are generally parallel.

9. A seat assembly comprising:
a seat bottom;
a seat back mounted adjacent the seat bottom and extending generally in an upright direction, wherein the seat back and seat bottom are provided with an occupant seating surface; and
first and second air bladders each having a support surface defined by a wide portion extending to a tapered portion having a width less than the wide portion, wherein when the first and second air bladders are inflated, the support surfaces of the first and second air bladders are inclined relative to the seating surface,
wherein the first air bladder is disposed in the seat bottom and the second air bladder is disposed in the seat back, and
wherein the first and second air bladders are positioned with the elongated tapered portions oriented toward each other and the enlarged width portions oriented away from each other.

10. The seat assembly of claim 9 wherein the tapered portion of each of the first and second air bladders is configured to inflate to a first height being greater than a second height of the wide portion.

11. The seat assembly of claim 9 wherein the seating surface of the seat back and the seat bottom are joined at a bite line, wherein the first and second air bladders are oriented with the tapered portion positioned closer to the bite line than the enlarged width portion.

12. The seat assembly of claim 11 wherein both of the first and second air bladders are oriented with the tapered portion positioned between the bite line and the enlarged width portion.

13. The seat assembly of claim 9 wherein there is no other air bladder between the first and second air bladders.

14. The seat assembly of claim 9 wherein the support surface of at least one of the first and second air bladders is defined by a hexagonal shape.

15. The seat assembly of claim 14 wherein the tapered portion of the hexagonal shape defines an irregular trapezoid shape.

16. The seat assembly of claim 15 wherein the wide portion of the hexagonal shape is a rectangle shape, wherein a long edge of the rectangular shape and a short edge of the trapezoid shape are generally parallel.

17. The seat assembly of claim 1 wherein the tapered portion of each of the first and second air bladders is configured to inflate to a first height being greater than a second height of the width portion.

* * * * *